(12) United States Patent
Ding et al.

(10) Patent No.: US 6,413,652 B1
(45) Date of Patent: Jul. 2, 2002

(54) PLATABLE ENGINEERED POLYOLEFIN ALLOYS

(75) Inventors: Ruidong Ding, Arlington; Satchit Srinivasan, Carrollton; Scott Matteucci, Arlington, all of TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 0 days.

(21) Appl. No.: 09/566,119

(22) Filed: May 5, 2000

(51) Int. Cl.$^7$ ................................................. C08F 36/06
(52) U.S. Cl. ....................... 428/626; 525/323; 525/240; 525/331.7; 525/331.9; 205/165; 205/927; 205/928; 428/935
(58) Field of Search ................................ 205/927, 928, 205/164, 165; 524/70; 525/240, 323, 331.7, 331.9; 428/626, 935

(56) References Cited

U.S. PATENT DOCUMENTS

| | | | |
|---|---|---|---|
| 3,466,232 A | 9/1969 | Francis et al. | 204/30 |
| 3,655,433 A | 4/1972 | Poppe et al. | 117/138.8 |
| 3,663,260 A | 5/1972 | Poppe et al. | 117/47 |
| 3,918,927 A | 11/1975 | Wells | 29/195 |
| 3,926,932 A | 12/1975 | Abu-Isa | 260/93.7 |
| 3,929,702 A | 12/1975 | Miller et al. | 260/27 |
| 4,038,042 A | 7/1977 | Adelman | 428/625 |
| 4,111,898 A | 9/1978 | Inayoshi et al. | 260/42.53 |
| 4,199,491 A * | 4/1980 | Inayoshi et al. | 260/31.2 R |
| 4,772,496 A * | 9/1988 | Maeda et al. | 428/35 |
| 4,945,005 A | 7/1990 | Aleckner, Jr. et al. | 428/500 |
| 4,946,896 A | 8/1990 | Mitsuno et al. | 525/93 |
| 4,950,541 A | 8/1990 | Tabor et al. | 428/373 |
| 5,140,070 A * | 8/1992 | MacLeay et al. | 525/169 |
| 5,883,188 A | 3/1999 | Hwang et al. | 525/71 |
| 5,959,042 A | 9/1999 | Bouilloux et al. | 525/420 |
| 6,027,817 A | 2/2000 | Otsuki | 428/461 |

FOREIGN PATENT DOCUMENTS

| | | |
|---|---|---|
| EP | 0 794 225 | 9/1997 |
| JP | 10-219040 | 8/1998 |
| WO | WO97/38050 | 10/1997 |

OTHER PUBLICATIONS

James M. Margolis, entitled Plating On Plastics, A Technical Economic and Marketing Report (1984), pp. 35–59.

Kiyoo Kato et al., "New Developments in Styrenic Block copolymers (SEBS) for Polypropyrene Modification", TUFTEC Development and Technology Department, Asahi Chemical Industry Co. Ltd. (9 pages) (undated), No Date is Available.

Gerald A. Krulik, "Electrolytic Plating", Plastics Finishing and Decorating, pp. 268–317 (undate). No Date is Available.

* cited by examiner

Primary Examiner—Kishor Mayekar
Assistant Examiner—Thao Tran
(74) Attorney, Agent, or Firm—Winston & Strawn

(57) ABSTRACT

This invention relates to polyolefin alloys that are receptive to metal plating. These compositions also have enhanced properties and are easily processed into articles by various molding methods. The blends of the invention preferably include polyolefin homopolymers or copolymers, acrylonitrile-butadiene-styrene polymers, and styrenic block copolymers. These blends have excellent platability and superior physical properties including enhanced rigidity, thoughness, and dimensional stability.

21 Claims, No Drawings

PLATABLE ENGINEERED POLYOLEFIN ALLOYS

FIELD OF INVENTION

The present invention relates to polyolefin alloys that are specially formulated to be readily plated with various metals. These compositions can be easily processed into molded articles by molding methods, such as injection, and then plated with metal to provide a decorative or functional finish. More particularly, these compositions are blends of polyolefin homopolymers or copolymers, acrylonitrile-butadiene-styrene polymers, and styrenic block copolymers, which blends have excellent platability as well as superior physical properties including enhanced rigidity, toughness, and dimensional stability.

BACKGROUND ART

A substantial market exists for metal plated thermoplastics, particularly for applications in the automotive industry. The current overwhelming choice of plastic materials for such applications include acrylonitrile-butadiene-styrene ("ABS") engineered resins, either alone or in polymer alloys with polycarbonates. These materials are useful due to the degree of unsaturation and polarity of the plastic which render it suitable for metal plating.

There are disadvantages in the use of ABS resins. The platable grades are relatively expensive, while the final properties of the metal plated plastic are not all that are desired. In an effort to improve upon the properties of the plastic, impact modified polypropylene blends have been utilized as alternatives. These blends include thermoplastic polyolefins and are widely used in interior and exterior automotive applications, such as bumpers, body panels, fascia, and the like. Many of these are decorated by full or partial painting for enhanced visual or functional effects.

Polypropylene is difficult to plate with metal, however, due to its lack of polarity or unsaturation. While it can be plated using special electroplating conditions, it generally is not because of cost and availability considerations. As polypropylene has certain performance advantages compared to ABS, the modification of this material to improve platability has been studied.

U.S. Pat. No. 3,655,433 discloses polyolefin alloys that are suitable for electroplating, wherein the adhesion of metal to the compositions is enhanced by incorporating into the composition a metal resinate. Crystalline polyolefins are modified with metal resins to improve the adhesion of metal thereto.

U.S. Pat. No. 3,663,260 discloses a metallizable polyolefin superimposed on a metal layer, wherein the polyolefin contains a finely divided talc having a platey (minacious) or massive (granular) particle shape. The talc filled polyolefin composition may be metallized by electroplating or other metallizing processes to form metallized shaped articles.

U.S. Pat. No. 3,918,927 discloses electroplating of polypropylene polymers containing a non-porous natural silica filler by conditioning a preformed article of the propylene polymer with a high acid content chromate conditioning agent followed by preplating the conditioning agent with an electrolessly platable metal, and then electroplating the preplated article with a final finish to obtain a metal-plated propylene polymer product.

U.S. Pat. No. 3,929,702 discloses a polypropylene composition that can be formed into a predetermined shape and can be plated with a coating of one or more metals. The polypropylene compositions comprise polypropylene polymer having a polyhydric aromatic compound and a resinous material.

U.S. Pat. No. 4,038,042 discloses polyolefin based compositions that are blends of particular proportions and types of polypropylene, low polarity rubber, highly conductive carbon black, polyethylene and optional mineral additives that provide electroplating to give adherent, plated surfaces.

Despite these patents, there still exists a need for olefinic materials containing polypropylene that are readily electroplatable utilizing conventional processes to obtain parts or components that are visually appealing as well as functional. The present invention satisfies this need.

SUMMARY OF THE INVENTION

The invention relates to platable polyolefin blends comprising a propylene-containing polymer formed from a semi-crytalline homopolymer of propylene or a copolymer of propylene with ethylene or an alpha olefin, a polymeric compatibilizer that contains styrene and is present in an amount sufficient to facilitate adhesion between the components of the blend, and an ABS resin component of an acrylonitrile-butadiene-styrene resin or a blend of styrene-acrylonitrile resin with a diene. The ABS resin component is present in an amount sufficient to render the polyolefin blend suitable for electroplating.

In a preferred embodiment, the platable polyolefin blend includes a toughening agent of a substantially amorphous copolymer or terpolymer of ethylene and an alpha olefin. In particular, the substantially amorphous copolymer or terpolymer includes but is not limited to ethylene, an alpha olefin, and a diene or mixtures thereof.

Advantageously, the compatibilizer is a block copolymer comprising at least two different block components of styrene-ethylene/butylene-styrene, styrene-butadiene-styrene, styrene-ethylene/propylene-styrene, styrene-ethylene/butylene, styrene/ethylene-propylene, styrene-butadiene-styrene, styrene/butadiene, styrene-ethylene/propylene-styrene-ethylene/propylene, styrene/isoprene, styrene-isoprene-styrene or mixtures thereof.

Additionally, the compatibilizer can comprise copolymers of ethylene and styrene. The compatiblizer can also comprise random copolymers, random copolymers that have block segments or mixtures thereof.

In these blends, the propylene-containing polymer is typically present in an amount of about 20 to 80 weight percent, the polymeric compatibilizer is present in an amount of about 0.01 to 20 weight percent, and the ABS resin component is present in an amount of about 5 to 80 weight percent of the alloy. When present, the substantially amorphous copolymer or terpolymer of ethylene and an alpha olefin is used in an amount of about 0.01 to 30 weight percent. When an inorganic filler is included, it is typically present in an amount of about 0.01 to 30 percent by weight.

In a preferred embodiment the platable polyolefin blend is a molded article of manufacture comprising a propylene-containing polymer formed from a semi-crytalline homopolymer of propylene or a copolymer of propylene with ethylene or an alpha olefm, a polymeric compatibilizer that contains styrene and is present in an amount sufficient to facilitate adhesion between the components of the blend, and an ABS resin component of an acrylonitrile-butadiene-styrene resin or a blend of styrene-acrylonitrile resin with a diene, the ABS resin component being present to render the polyolefin blend suitable for electroplating. In a preferred embodiment the platable polyolefin blend can comprise a substantially amorphous copolymer or terpolymer of ethylene and an alpha olefin. In a particular embodiment, the substantially amorphous copolymer or terpolymer includes ethylene and an alpha olefin or a diene. In another particular embodiment the molded article of manufacture is in the form of an automotive component.

Another embodiment of the invention encompasses a process for preparing a plated polyolefin article which comprises blending a propylene-containing polymer formed from a semi-crytalline homopolymer of propylene or a copolymer of propylene with ethylene or an alpha olefin, a polymeric compatibilizer that contains styrene and is present in an amount sufficient to facilitate adhesion between the components of the blend, and an ABS resin component of an acrylonitrile-butadiene-styrene resin or a blend of styrene-acrylonitrile resin with a diene, the ABS resin component being present to render the polyolefin blend suitable for electroplating, wherein the article has a desired form, shape, and an exterior surface, and then first depositing an initial conductive metal onto at least a portion of the surface of the article, and secondly plating polyolefin article with a second metal.

In a preferred embodiment, the polyolefin article is prepared by molding the blend. In another preferred embodiment, the second metal is deposited by electroplating or by vacuum deposition. In a particular embodiment, the initial conductive metal is copper, a nickel/phosphorus alloy, or a mixture thereof. In a particular embodiment, the second metal is selected from the group comprising nickel, copper, and chromium, or a mixture thereof.

In another embodiment, the invention encompasses a molded polyolefin article produced by the process of preparing a plated polyolefin article which comprises blending a propylene-containing polymer formed from a semi-crytalline homopolymer of propylene or a copolymer of propylene with ethylene or an alpha olefin; a polymeric compatibilizer that contains styrene and is present in an amount sufficient to facilitate adhesion between the components of the blend; and an ABS resin component of an acrylonitrile-butadiene-styrene resin or a blend of styrene-acrylonitrile resin with a diene, the ABS resin component being present to render the polyolefin blend suitable for electroplating, wherein the article has a desired form, shape, and an exterior surface, and then depositing a metal onto at least a portion of the exterior surface of the article to provide the plated polyolefin article. In a particular embodiment, the plated polyolefin article is in the form of an automotive component.

DETAILED DESCRIPTION OF THE INVENTION

It has now been advantageously found that the platability of semi-crystalline homopolymers or copolymers of propylene with ethylene or other alpha olefins can be improved by the addition of certain ABS resin components. The term "ABS resin components" refers to resins of acrylonitrile-butadiene-styrene or styrene-acrylonitrile and a diene. A preferred diene is polybutadiene.

As used herein, the word "blend" or "blends" includes the mechanical polyblends, mechanochemical polyblends, chemical polyblends, solution cast polyblends and latex polyblends as described in the Kirk-Othmer Concise Encyclopedia of Chemical Technology, Volume 24, $3^{rd}$ ed. pp. 920–922; Wiley & Sons, New York. The word "blend" also includes physical mixtures of at least two polymeric materials. The polyolefin alloy of the invention include such blends as discussed herein.

The primary component of the blend is a propylene containing polymer. It is typically present in the largest proportion. This polymer is preferably a homopolymer of propylene or a copolymer of propylene and ethylene or another alpha olefin. This component is most often characterizable as semi-crystalline in compositions according to the present invention. As used herein, "semi-crystalline" means that the crystallinity is at least about 30% and preferably is at least about 50% and more preferably to about 80%.

Suitable types of homopolymers of propylene include highly isotactic homopolymers of polypropylene. An acceptable copolymer of propylene is an ethylene-propylene copolymer. The ethylene-propylene copolymers include but are not limited to sequentially polymerized blends of polypropylene with ethylene-alpha olefin copolymers. Ethylene-alpha olefin copolymers are comprised of alpha olefins having from 3 to 18 carbon atoms. Preferred alpha olefins are $C_3$ to $C_{10}$ alpha olefins, more preferably butene or octene and most preferably octene. It is preferred that the propylene polymer component make up at least 20 to 80 weight percent of the overall composition, more preferably 22 to 75 weight percent and even more preferably 25 to 70 weight percent. Moreover, this component has a typical melt flow rate (as determined by ASTM 1238 at a temperature of 230° C.) of between about 0. 1 to 200 g/10 min, preferably between about 0.5 to 100 g/10 min, and more preferably between about 1–60 g/10 min.

The polyolefin alloy of the present invention can be easily processed into molded articles by a molding method, such as, but not limited to, injection molding or extrusion molding, and can afford products that have well balanced properties including, but not limited to, platability, stiffness, and impact resistance. The polyolefin alloy of the present invention have, at the same time, unexpectedly high dimensional stability, hardness (and therefore scratch resistance) and good paintability, while still possessing a desirable melt flow rate. All these properties are obtained at significantly higher reinforcement levels than other polyolefin materials with similar toughness. This overall combination of properties is desirable for parts or molded articles used in many industries, notably, the automotive industry. The ability of these parts to be plated with metal further enhances the appearance and usefulness of these articles.

The present invention represents a significant advance in the art since an improved blend comprising polyolefin homopolymers and copolymers and acrylonitrile-butadiene-styrene resin and styrenic block copolymers that facilitate platability of various metals are described. Metals that can be plated include, but are not limited to, copper, nickel, and chromium. Moreover, the use of ABS in a polypropylene matrix enhances the interfacial interaction resulting in improved platability, as compared with currently used platable alloys. Although ABS is the most commonly used plastic for metal plating, the cost of plating grades of ABS is rather high, and the properties of plated ABS are not all that is desired. The use of polypropylene in addition to ABS, as a polymeric base to be metal plated, has certain advantages. Polypropylene is more chemically inert, has a lower water absorption, and is a low cost material.

The blends of the invention may be plated with metal using any of a wide variety of existing techniques. While polypropylene alone is difficult to plate using conventional electroplating processes, the addition of ABS in a polypropylene matrix allows for the platability of these materials due to the nature of the ABS resin. Moreover, by adding styrenic block copolymers, the interfacial interactions of different phases in polymer blends, which significantly influences the morphology, dispersion, and distribution of the polymer phase, is significantly enhanced. As a result, the polyolefin alloy prepared by this invention exhibit excellent plating performance and have well-balanced physical properties of stiffness, toughness, and dimensional stability.

As noted, the alloys of the present invention may be formed into the desired shape or configuration by any of a number of means well known to those skilled in the art, such as various types of conventional molding procedures, extrusion procedures, or the like, including forming into cast or oriented film, direct extrusion or other types of fiber forming, and the like.

After forming, the metal plating can likewise be accomplished by any number of procedures well known to those skilled in the art. For example, there are a wide variety of specific procedures for vacuum deposition of a thin surface coating of metal over a plastic, and an even wider variety of specific procedures for chemical deposition of such a coating. Also, following the vacuum or chemical deposition steps, the desired thickness of a metal coating and/or the coating of additional metals can be obtained by a number of well known electroplating, or other techniques.

A number of commercial plastic plating techniques have been developed, and many of these are well known in the art. These include, for example, the so-called Ethone System and/or the MacDermid System. Typically, however, wide variations in plating bath additives and the concentrations of such additives, as well as other significant differences exist within any single given system. For example, most of these commercial plating systems were originally designed for plating ABS compositions, and the number of modifications, such as changes in the concentrations in the components of the acid etching baths, must be made where these systems are employed in the plating of propylene.

Any platable metal can be used to plate the polyolefin alloy of the current invention, which metals include, but are not limited to, copper, semi-bright nickel, copper or nickel strike, nickel, bright nickel, and chromium. The majority of compositions are plated with a copper/nickel/chromium electroplate. These finishes are seldom a single metal finish, usually they are two or more successive layers. In addition, one or more metal layers comprising one or more platable metals may be electro-deposited upon a plastic. Typically, layers may have a thickness from about 0.1 to 80 micrometers, preferably from about 0.15 to 70 micrometers, and even more preferably from about 0.2 to 60 micrometers. However, one of ordinary skill in the art would readily recognize that the choice of metal used and the thickness of the layer would depend on the desired application.

As compared with conventional platable compositions, the compositions of the present invention consistently exhibited superior adhesion under all types of forming, processing, and/or plating procedures. Moreover, as novel compositions are disclosed herein, these improvements in adhesion appear to be improvements in both the kind and degree of adhesion.

Also present in the polyolefin composition of the present invention is a toughening agent of a substantially amorphous copolymer or terpolymer of ethylene and an alpha olefin. This component is present as a toughening component for the blend. A preferred copolymer is a semi-crystalline rubbery copolymer of two or more alpha mono-olefins, such as copolymers of ethylene and propylene. Also suitable are terpolymers of semi-crystalline rubbery copolymers of two or more alpha mono-olefins, such as ethylene and propylene, and a lesser quantity of a nonconjugated diene.

Suitable alpha olefins that can be used in the toughening component are illustrated by the formula $CH_2\!=\!CHR$, wherein R is hydrogen or an alkyl radical of one to sixteen carbon atoms. Examples of suitable alpha olefins include, but are not limited to ethylene; propylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-1-pentene; 5-methyl-1-hexene; 1-4-ethyl-1-hexene; and mixtures thereof.

Suitable nonconjugated dienes that can be used in the toughening component include, but are not limited to, straight chain dienes such as butadiene, 1,4-hexadiene; cyclic dienes such as cyclooctadiene; and bridged cyclic dienes such as ethylidene norbornene.

This toughening agent is present in an amount sufficient to impart toughening properties to the composition and contribute to the impact resistance of the blends. Sufficient amounts of the toughening component are from about 0.01 to 30 weight percent, preferably from about 5 to 25 weight percent, and more preferably from about 10 to 20 weight percent of the polyolefin composition. Moreover, when a terpolymer is used, the amount of diene in the terpolymer in not critical and values as low as 0.5 weight percent of the toughening component are useful. Typically, the diene content of the terpolymer will be from about 3 to 25 weight percent, and preferably from 7 to 20 weight percent of the toughening component.

Another component in the polyolefin composition of the present invention is a polymeric compatibilizer that contains styrene. This component acts as an interfacial modifier to facilitate adhesion of the components. The compatibilizer is preferably a thermoplastic elastomer that includes styrene or styrene blocks, such as a styrenic block copolymer. In a preferred embodiment the polymeric compatibilizer is present in an amount from about 0.01 to about 20 weight percent of the platable polyolefin composition, more preferable from about 2 to about 15 weight percent platable polyolefin composition, and even more preferable from about 5 to about 10 weight percent of the platable polyolefin composition. In addition to significantly improving adhesion between the polymeric phases, this component contributes to compatibility with other components, such as the optional filler. This leads to the high toughness of the overall composition while improving rigidity. The terms "styrene block copolymer" or "styrenic block copolymer" are used to designate an elastomer having at least one block segment of a styrenic monomer in combination with saturated or unsaturated rubber monomer segments. The structure of the styrene block copolymers useful in the present invention can be of the linear or radial type, and of the diblock or triblock type.

Acceptable styrenic block copolymers include copolymers of styrene with ethylene and another alkene. Preferred copolymers include styrene-(ethylene-butene)-styrene, styrene-(ethylene-propylene)-styrene, styrene-(ethylene-butene), styrene-(ethylene-propylene), styrene-butene-styrene, styrene-butene, styrene-butadiene, styrene-isoprene, hydrogenated variations thereof, and blends thereof. The more preferred styrenic block copolymers are those having at least four different blocks or a pair of two repeating blocks. For example, repeating styrene/butadiene or styrene/ethylene propylene blocks are desirable, with a most preferred copolymer being one having styrene/ethylene-propylene/styrene/ethylene-propylene blocks. It is also preferred that the styrenic block copolymer component make up about 0.01 to 10 weight percent of the overall composition, more preferably about 2 to 9 weight percent and even more preferably about 4 to 8 weight percent of the polyolefin composition.

The styrenic portion of the block copolymer is preferably a polymer or interpolymer of styrene and its analogs and homologs, including alpha methylstyrene, and ring-substituted styrenes, particularly ring-methylated styrenes. The preferred styrenics are styrene and alpha methylstyrene, with styrene being especially preferred. Additionally, the compatibilizer can comprise a random styrenic copolymer of ethylene and styrene in place of or in addition to the styrenic block copolymer. The quantity of styrene in the random styrenic copolymer should be at least about 50 weight percent, preferably at least about 60 weight percent, more preferably 70 weight percent of the polyolefin alloy. It is particularly preferred that the random styrenic copolymer of ethylene and styrene have a blocky comonomer distribution. By blocky comonomer distribution it is meant that there are more repeating monomer units than would be expected in a random distribution. Such a distribution would be provided by a random distribution of blocks of a plurality of monomer units. This type of polymer can be manufactured by single-site catalysis, i.e., metallocene or single-site non-metallocene catalysis. The random styrenic copolymer containing ethylene and styrene is present in an amount of about 0.01 to 10 weight percent of the overall composition, more preferably about 2 to 9 weight percent and even more preferably about 4 to 8 weight percent of the polyolefin composition.

The key component of the platable polyolefin composition is the ABS derivative, which is preferably an acrylonitrile-butadiene-styrene resin. This ABS resin is a polymer made by blending acrylonitrile-styrene copolymer with a butadiene-acrylonitrile rubber or by interpolymerizing polybutadiene with styrene and acrylonitrile. This component combines the advantages of hardness and strength of the vinyl resin component with the toughness and impact resistance of the rubbery component. It is preferred that this component make up at least about 5 to 80 weight percent of the polyolefin composition, more preferably 8 to 50 weight percent of the polyolefin composition, and even more preferably 10 to 40 weight percent of the polyolefin composition.

The polyolefin composition of the present invention may also optionally include a mineral filler. Higher levels of mineral filler can increase stiffness and reduce shrinkage, especially in combination with the other components in the polyolefin composition of the present invention. The mineral filler can be a treated or untreated inorganic material. Preferred fillers include, but are not limited to, talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres; silica, mica, glass or carbon fiber, or clay or any combination thereof. Talc is the most preferred mineral filler. It is also preferred that the mineral filler be present in an amount from about 0.01 to 30 weight percent, more preferably about 5 to 20 weight percent and even more preferably about 8 to 15 weight percent of the polyolefin composition.

In addition to the above-described components, if necessary, additional components such as a colorant, a stabilizer, a plasticizer, and a lubricant can be added. Additional components can further include: reinforcing agents and processing aids.

The polyolefin alloys of the present invention will preferably have an Izod impact strength at −30° C. of at least about 0.2–3.0 ft-lb/in, a flexural modulus of at least about 100–290 kpsi, a melt flow rate of at least about 1 g/10 min at 230° C. These properties are those as measured according to the methods given in the examples that follow; such standards are to be taken as defining these properties when interpreting the claims.

Given the good balance of toughness and rigidity in the materials of the present invention, as well as other excellent properties noted previously, the polyolefin alloys of the invention are suitable for many specialized applications. For example, the polyolefin alloys can be shaped into components used in many interior and exterior automobile parts. As used herein, "shaping" could include molding and/or extruding, with the injection molding of a blend of the recited components being preferred. The resultant molded articles are highly useful for applications such as automobile door panels and bumpers.

The invention is further defined by reference to the following examples, describing the preparation of the polyolefin alloys of the present invention as well as their utility. It will be apparent to those skilled in the art that many modifications, both to materials and methods, may be practiced without departing from the purpose and interest of this invention. Thus, the following examples are offered by way of illustration, and not by way of limitation, to describe in greater detail the preparation, treatment, and testing of the novel polyolefin alloys.

EXAMPLES

The polyolefin based composition of the present invention can be prepared in one step. Approximately 20–80% of a polypropylene-containing polymer formed from a semi-crystalline homopolymer of propylene or copolymer or propylene with ethylene with an alpha olefin was combined with about 5–80% an ABS resin component of an acrylonitrile-butadiene-styrene resin or a blend of styrene-acrylonitrile resin with a diene, about 0.01–10% of a polymeric compatibilzer that contains styrene in an amount sufficient to facilitate adhesion between the polymer components of the blend, optionally about 0.01–30% of a substantially amorphous copolymer or terploymer of ethylene and an alpha olefin, and optionally a mineral filler along with the appropriate stabilizers were then blended in a continuous twin-screw extruder or other batch type mixing equipment to afford the polyolefin composition.

The polyolefin composition is then surface treated, wherein such treatment includes cleaning, etching, neutralizing, catalyzing or accelerating the surface. Cleaning is a carefully programmed series of selective dip-treatment steps. Each step requires controlled treatment with the cleaning chemicals matched with the individual polyolefin composition. Etching creates a microporous surface on the composition. An etch system typically consists of chromic acid or a chromic acid/sulfuric acid etchant. The etchant chemically dissolves potions of the surface by oxidation, leaving a chemically modified and micro-roughened surface. Neutralizing is a method of reducing any chromic acid left in the pores of the composition surface from hexavalent $Cr^{+6}$ to trivalent $Cr^{+3}$, since $Cr^{+6}$ is detrimental to later steps. A catalyst promoter may be used in conjugation with the neutralizer. These promoters create a polar charge on the composition. A catalyst bath is normally a palladium chloride/stannous chloride solution that is absorbed into the micro-pores created in the etch step. The palladium will act as active catalyst sites for chemical reduction of the electroless copper or electroless nickel. An accelerator bath removes loosely adherent palladium and excess tin and provides a surface on which the copper or nickel can plate quickly and easily.

Electroless plating forms the initial conductive metal layer upon which the metal is electroplated. This metal layer normally is pure copper or nickel/phosphorus alloy, depending on the corrosion requirements of the plated part. Both electroless copper and electroless nickel baths contain combinations of metal salts, chelaters, stabilizers, and reducers. The metal from metal salts chemically reduces onto the active palladium sites from the catalyzing step. After palladium sites are covered the reaction become autocatalytic and the deposit continues to build on itself at a controlled rate. These metals are usually allowed to deposit to about 0.5 to 1.0 $\mu$m. Parts are then ready for electroplating. This is also referred to as chemical deposition.

The electroplating process electrolytically builds the initial electroless metal layer to a thick, durable finish. The thick metal layer here allows standard electroplating processes to be used. The majority of compositions are plated with a copper/nickel/chrome electroplate. These finishes are seldom a single metal finish, usually they are two or more successive layers. For example, an exterior automotive part requires a layer of bright acid copper, a layer of semi-bright nickel, a layer of bright nickel, a layer of particle nickel, and a layer of chrome.

The electroplated film of metal is produced by placing the plastic having a thin film of chemically deposited metal thereon in a solution containing ions of the metal that is desired to electroplate, e.g., copper, nickel, or chrome. An electrical current is then passed through the solution, and the thin film of metal results in the deposition of the new metal and forms a film having the desired thickness.

Examples 1–6
Platable Polyolefin Alloys results in poor surface appearance, i.e., delamination of the surface occurs (See Example 1).

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. A platable polyolefin blend comprising the following components:
   a propylene-containing polymer formed from a semi-crystalline homopolymer of propylene or a copolymer of propylene with ethylene or an alpha olefin;
   an hydrogenated polymeric compatibilizer that contains styrene and is present in an amount sufficient to facilitate adhesion between the components of the blend; and
   an ABS resin component of an acrylonitrile-butadiene-styrene resin or a blend of styrene-acrylonitrile resin with a diene, the ABS resin component being present in an amount sufficient to render the polyolefin blend suitable for electroplating.

2. The platable polyolefin blend of claim 1 comprising a toughening agent of a substantially amorphous copolymer or terpolymer of ethylene and an alpha olefin.

3. The platable polyolefin blend of claim 2, wherein the substantially amorphous copolymer or terpolymer of ethylene and an alpha olefin is present in an amount of about 0.01 to 30 weight percent.

4. The platable polyolefin blend of claim 2, wherein the substantially amorphous copolymer or terpolymer comprises ethylene and an alpha olefin and a diene or mixture thereof.

|  | Control 1 | Control 2 | Control 3 | Control 4 | Example 1 | Example 2 | Example 3 | Example 4 | Example 5 | Example 6 |
| --- | --- | --- | --- | --- | --- | --- | --- | --- | --- | --- |
| PP | 100 |  | 60 | 60 | 50 | 47.5 | 28 | 30 | 30 | 50 |
| ABS |  | 100 |  |  | 50 | 47.5 | 67 | 30 | 30 | 20 |
| Elastomer |  |  | 40 | 20 |  |  |  | 24 | 20 | 20 |
| Rubber 1 |  |  |  | 20 |  |  |  |  |  |  |
| Rubber 2 |  |  |  |  |  | 5 | 5 | 6 | 10 | 10 |
| Inorganic Filler |  |  |  |  |  |  |  | 10 | 10 |  |
| Flexural Modulus, kpsi | 325 | 323 | 131 | 122 | 276 | 272 | 275 | 216 | 182 | 161 |
| Elongation @ break, % | 6 | 31 | 410 | 230 | 4 | 7 | 8 | 20 | 38 | 140 |
| Izod @ −30° C., ft-lb/in | 0.25 | 1.2 | 1.52 | 1.13 | 0.20 | 0.40 | 0.33 | 0.49 | 1.00 | 1.40 |
| Electroplatable Test Results | No | Yes | No | No | Yes | Yes | Yes | Yes | Yes | Yes |
| Surface Appearance After Injection Molding | Good | Good | Good | Good | Poor | Good | Good | Good | Good | Good |

PP: Polypropylene
ABS: Acrylonitrile-butadiene-styrene resin
Elastomer: Copolymer of ethylene and alpha olefins; Ethylene content 75%; Molecular weight (MW): 140,000; Polydispersity: 1.97
Rubber 1: A diene rubber, such as polybutadiene
Rubber 2: A styrenic block copolymer, such as SEBS, SBS; Styrene content: 30–70%
Inorganic Filler: Talc
Electroplatable Test: No-not platable Yes-Platable As is shown in Table 1, the absence of the acrylonitrile-butadiene-styrene resin results in the conventional blends not being platable (See, for example, Control Examples 1, 3–4), while the blends prepared according to the current invention (See, for example, Examples 1–6) all show platability. Moreover, the surface appearance after injection molding is good in the presence of a styrenic polymer (See Examples 2–6), however, the absence of a styrenic polymer 5. The platable polyolefin blend of claim 1, wherein the compatibilizer is a block copolymer comprising at least two different block components of styrene-ethylene/butylene-styrene, styrene-ethylene/propylene-styrene, styrene-ethylene/butylene, styrene/ethylene-propylene, styrene-butadiene-styrene, styrene-butadiene, styrene-ethylene/propylene-styrene-ethylene/propylene, or mixtures thereof.

6. The platable polyolefin blend of claim 1, wherein the compatibilizer comprises copolymers of ethylene and styrene.

7. The platable polyolefin blend of claim 1, wherein the propylene-containing polymer is present in an amount of about 20 to 80 weight percent of the composition.

8. The platable polyolefin blend of claim 1, wherein the polymeric compatibilizer is present in an amount of about 0.01 to 20 weight percent.

9. The platable polyolefin blend of claim 1, wherein the ABS resin component is present in an amount of about 5 to 80 weight percent of the composition.

10. The platable polyolefin blend of claim 1, which further comprises an inorganic filler in an amount of about 0.01 to 30 percent by weight.

11. A molded article of manufacture comprising the polyolefin blend of claim 1.

12. The molded article of claim 11 in the form of an automotive component.

13. The platable polyolefin blend of claim 1, wherein the hydrogenated polymeric compatibilizer comprises styrene-ethylene/butylene-styrene and styrene-butadiene.

14. The platable polyolefin blend of claim 1, wherein the styrene-ethylene/butylene-styrene is present in an amount of about 0.01 weight percent to 20 weight percent.

15. A process for preparing a plated polyolefin article which comprises:

blending a propylene-containing polymer formed from a semi-crystalline homopolymer of propylene or a copolymer of propylene with ethylene or an alpha olefin; an hydrogenated polymeric compatibilizer that contains styrene and is present in an amount sufficient to facilitate adhesion between the components of the blend; and an ABS resin component of an acrylonitrile-butadiene-styrene resin or a blend of styrene-acrylonitrile resin with a diene, the ABS resin component being present to render the polyolefin blend suitable for electroplating, to form an article having a desired form, shape, and an exterior surface;

depositing an initial conductive metal onto at least a portion of the surface of the article; and plating the polyolefin article with a second metal.

16. The process of claim 15, wherein the polyolefin article is prepared by molding the blend.

17. The process of claim 15, wherein the second metal is deposited by electroplating or by vacuum deposition.

18. The process of claim 15, wherein the initial conductive metal is copper, a nickel/phosphorus alloy, or a mixture thereof.

19. The process of claim 15, wherein the second metal comprises nickel, copper, chromium, or a mixture thereof.

20. A molded polyolefin article produced by the process of claim 15.

21. The molded polyolefin article of claim 20 in the form of an automotive component.

* * * * *

UNITED STATES PATENT AND TRADEMARK OFFICE
CERTIFICATE OF CORRECTION

PATENT NO. : 6,413,652 B1
DATED : July 2, 2002
INVENTOR(S) : Ding et al.

It is certified that error appears in the above-identified patent and that said Letters Patent is hereby corrected as shown below:

<u>Title page,</u>
Item [56], OTHER PUBLICATIONS, after "pp. 268-317", change "(undate)." to -- (undated). --.
Item [57], ABSTRACT,
Line 9, change "thoughness," to -- toughness, --.

<u>Column 11,</u>
Line 23, change "claim 1," to -- claim 13, --.

Signed and Sealed this

Seventeenth Day of December, 2002

JAMES E. ROGAN
*Director of the United States Patent and Trademark Office*